(12) United States Patent
Malsam et al.

(10) Patent No.: US 6,663,028 B2
(45) Date of Patent: Dec. 16, 2003

(54) WHEEL TRACK CLOSING ASSEMBLY

(75) Inventors: Craig S. Malsam, Omaha, NE (US); Dale A. Christensen, Arlington, NE (US)

(73) Assignee: Valmont Industries, Inc., Valley, NE (US)

( * ) Notice: Subject to any disclaimer, the term of this patent is extended or adjusted under 35 U.S.C. 154(b) by 328 days.

(21) Appl. No.: 09/927,973

(22) Filed: Aug. 10, 2001

(65) Prior Publication Data

US 2003/0029943 A1 Feb. 13, 2003

(51) Int. Cl.⁷ .............................. B05B 3/00; B05B 3/18; A01C 23/00; A01B 49/02; A01B 5/00
(52) U.S. Cl. .................. 239/722; 239/728; 111/118; 172/134; 37/142.5
(58) Field of Search ............... 239/722, 728, 239/723, 724, 735, 737, 739, 743; 111/118, 119, 127; 172/134; 37/142.5

(56) References Cited

U.S. PATENT DOCUMENTS

| 2,164,543 | A | 7/1939 | Peacock | 97/47 |
|---|---|---|---|---|
| 2,277,880 | A | 3/1942 | Noble | 97/47 |
| 2,505,280 | A | 4/1950 | Ellinghuysen | 97/47 |
| 2,591,522 | A | 4/1952 | Dejoy | 37/181 |
| 2,889,640 | A | 6/1959 | Endres | 37/42 |
| 3,306,368 | A | 2/1967 | Rosenvold | 172/276 |
| 3,908,292 | A | 9/1975 | Harris | 37/142.5 |
| 3,934,363 | A | 1/1976 | McMurray | 37/82 |
| 4,005,944 | A | 2/1977 | Harris | 404/133 |
| 4,059,911 | A | 11/1977 | Bean et al. | 37/142.5 |
| 4,079,788 | A | 3/1978 | Derr | 172/176 |
| 4,192,388 | A | 3/1980 | Goebel | 172/463 |
| 4,209,068 | A | 6/1980 | Corsentino | 172/572 |
| 4,262,752 | A | 4/1981 | Parish | 172/574 |
| 4,283,867 | A | 8/1981 | Brown | 37/142.5 |
| 4,539,765 | A | 9/1985 | Reece | 37/142.5 |
| 4,601,347 | A | * 7/1986 | Parish | 172/134 |
| 4,623,024 | A | 11/1986 | Schlenker | 172/572 |
| 4,914,840 | A | 4/1990 | Porter | 37/142.5 |
| 5,845,717 | A | 12/1998 | Gillespie | 172/833 |
| 6,427,781 | B1 | * 8/2002 | Buhler et al. | 172/134 |

FOREIGN PATENT DOCUMENTS

| DE | 30 01 320 | 7/1980 |
|---|---|---|
| FR | 1.118.386 | 3/1956 |
| SU | 175323 | 3/1966 |

* cited by examiner

Primary Examiner—Michael Mar
Assistant Examiner—Darren Gorman
(74) Attorney, Agent, or Firm—Thomte, Mazour & Niebergall

(57) ABSTRACT

A wheel track closing assembly is described for use with a drive unit of a mechanized irrigation system. Each of the wheel track closing assemblies includes an elongated rigid arm which is longitudinally and pivotally connected to either the drive wheel or the gearbox for the drive wheel. A replaceable soil-engaging member in the form of oppositely disposed shovels is secured to the free end of the rigid arm for engaging the soil adjacent the wheel track to move the soil into the wheel track to close the same. When the direction of movement of the drive tower is reversed, the drive wheels walk-over the soil-engaging members so that the soil-engaging members are repositioned in a trailing position with respect to the associated drive wheels.

13 Claims, 5 Drawing Sheets

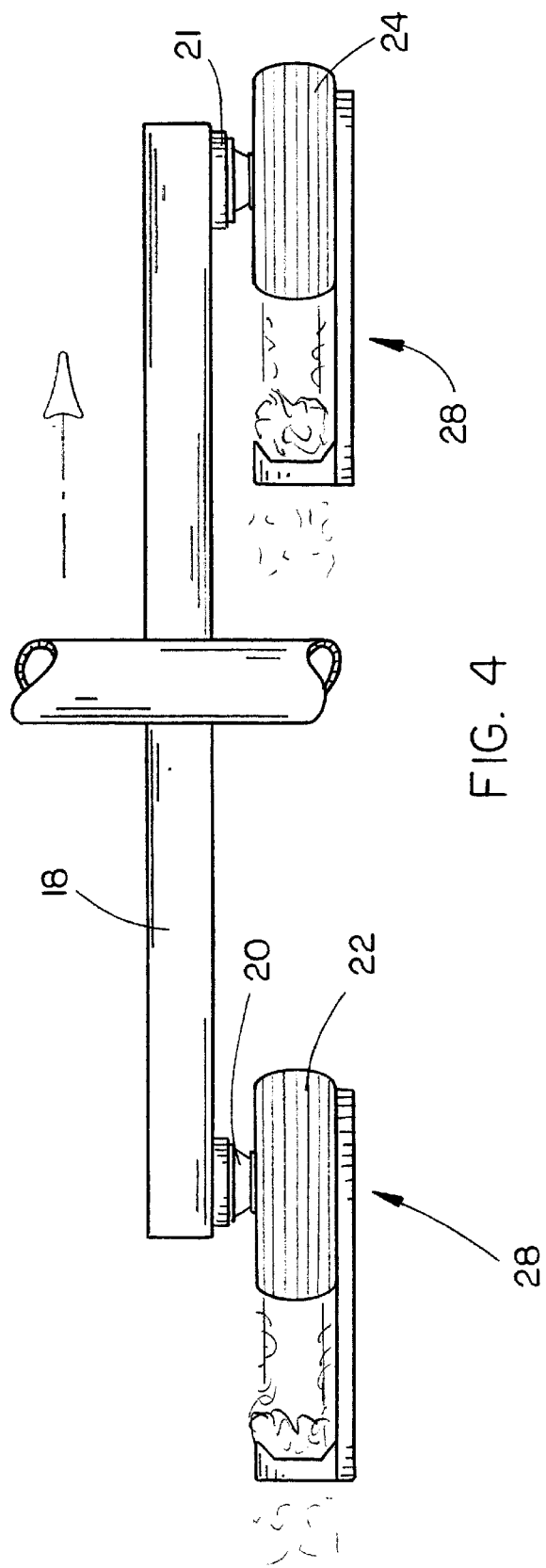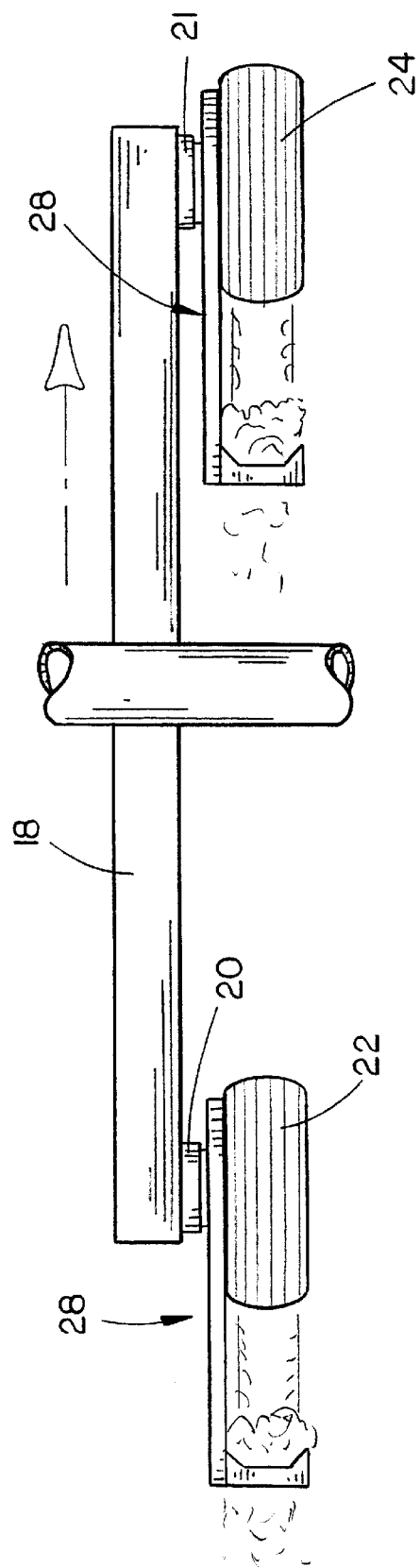

WHEEL TRACK CLOSING ASSEMBLY

BACKGROUND OF THE INVENTION

1. Field of the Invention

This invention relates to a wheel track closing assembly and more particularly to a wheel track closing assembly for use on a mechanized irrigation system.

2. Description of the Related Art

Mechanized irrigation systems, such as center pivot irrigation systems and linear move irrigation systems, include self-propelled drive units having drive wheels mounted on the opposite ends of a main beam of the drive unit. As the drive units propel the irrigation system through the field being irrigated, the drive wheels displace soil and create deep wheel ruts. The deep wheel ruts or tracks not only decrease the traction of the drive wheels, but also create problems when the field is being cultivated, planted, harvested, etc. Many prior art devices have been provided for improving traction and eliminating wheel tracks on mechanized irrigation systems, but those prior art devices normally involved permanently mounted shovels or disks. The problem with permanently mounted shovels or disks is when the direction of the machine is reversed. The operator is required to change the mounting of the shovel or disk to ensure proper operation relative to the direction of travel. In an effort to overcome the problems associated with the reversal of the machine, a prior art device consists of a shovel secured to the drive unit with chains with the shovel being dragged behind the drive unit wheels. Although such a structure allows some flexibility for reversing, the chains tend to get hung-up or tangled, leading to improper positioning behind the wheel. Sloping field conditions also contribute to improper positioning of such a prior art device.

SUMMARY OF THE INVENTION

A wheel track closing device is provided for use with the drive wheels of the drive towers of a mechanized irrigation system such as a center pivot irrigation system or a linear move irrigation system. Each of the wheel track closing assemblies comprises an elongated, rigid arm which is connected to either the gearbox of the drive wheel or to the drive wheel axle or spindle. A soil-engaging member in the form of a pair of opposing shovel members is mounted on the elongated arm and is adapted to close the wheel track as the drive unit is being moved through the field. The elongated arm has an elongated slot formed therein which receives a connection member from either the gearbox or the drive wheel so that the drive wheel may "walk-over" the soil-engaging member when the direction of the machine is reversed. A wheel track closing assembly may be mounted on each of the wheels of each of the drive units or may be mounted on only one of the wheels of the drive unit.

It is therefore a principal object of the invention to provide an improved wheel track closing assembly for use with mechanized irrigation systems.

Yet another object of the invention is to provide a wheel track closing assembly for an irrigation system drive unit wherein the wheel track closing assembly automatically shifts to a trailing position when the direction of movement of the system is reversed.

Still another object of the invention is to provide a wheel track closing assembly which includes an elongated rigid arm to properly position the soil-engaging member of the assembly.

Still another object of the invention is to provide a wheel track closing assembly for a mechanized irrigation system which may be mounted on the gearbox or drive wheel itself without extensive modification thereof.

Still another object of the invention is to provide a wheel track closing assembly for a mechanized irrigation system which enables the attachment of different shovel designs to accommodate different soil conditions.

These and other objects will be apparent to those skilled in the art.

BRIEF DESCRIPTION OF THE DRAWINGS

FIG. 4 is a partial top view illustrating the wheel track closing assemblies mounted on the drive wheels; and FIG. 5 is a view similar to FIG. 4 except that the wheel track closing assemblies are illustrated as being mounted on the side of the gearboxes.

DESCRIPTION OF THE PREFERRED EMBODIMENT

Figure 1:
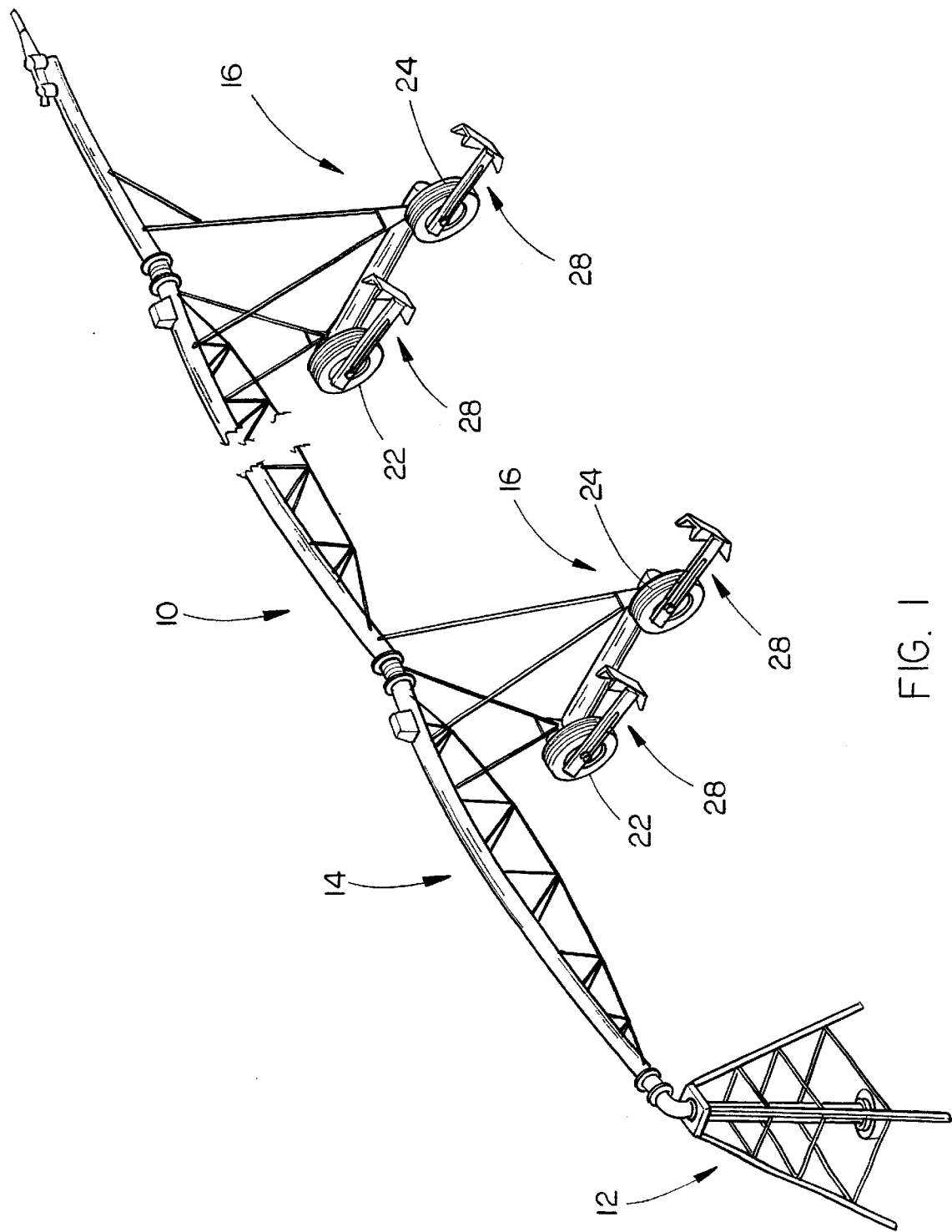
FIG. 1 is a partial perspective view illustrating a center pivot irrigation system having the wheel track closing assemblies of this invention mounted thereon.

The numeral 10 refers to a mechanized irrigation system commonly known as a center pivot irrigation system. The system 10 includes a center pivot structure 12 having a main water line 14 extending therefrom which is supported upon a plurality of self-propelled drive units or drive towers 16. Each of the drive units 16 includes a main beam 18 having gearboxes 20 and 21 mounted on the ends thereof which are connected to the drive wheels 22 and 24 in conventional fashion. Motor 26 is mounted on main beam 18 and is connected to the gearboxes 20 in conventional fashion. The motors 26 on the drive units 16 are reversible so that the drive units 16 may be driven in either a forward or rearward direction.

During the operation of the system 10, the drive wheels 22 and 24 on the drive units 16 create wheel tracks or ruts due to the weight of the system and due to the wet field conditions. Normally, soil ridges are created on opposite sides of the wheel tracks. Although the irrigation system 10 is shown to be of the center pivot type, the track closing invention to be described hereinafter may be used on lateral move irrigation systems as well.

The numeral 28 refers to the wheel track closing assembly of this invention. It is preferred that a wheel track closing assembly 28 be utilized for each of the drive wheels on each of the drive units, a single wheel closing assembly 28 could be used on the drive units 16. Further, although it is preferred that the assemblies 28 be used on all of the drive units 16, there may be some instances where the assemblies 28 may not be used on all the drive units 16.

The track closing assembly 28 may be operatively secured to the axle or hub of the associated drive wheel, as illustrated in FIGS. 1–4, or it may be secured to the associated gearbox, as illustrated in FIG. 5. Each of the assemblies 28 includes an elongated arm 30 having ends 32 and 34. Arm 30 has an elongated slot 36 formed therein which is adapted to receive a connector 38, such as a bolt or the like, which extends from either the associated axle or the associated gearbox. A soil-engaging member 40 is secured to end 34 of arm 30 and includes oppositely disposed shovel members 42 and 44 which are adapted to engage the soil ridges at the sides of the wheel track and to close or fill the wheel tracks with soil as the system is moved either forwardly or rearwardly.

Figure 2:
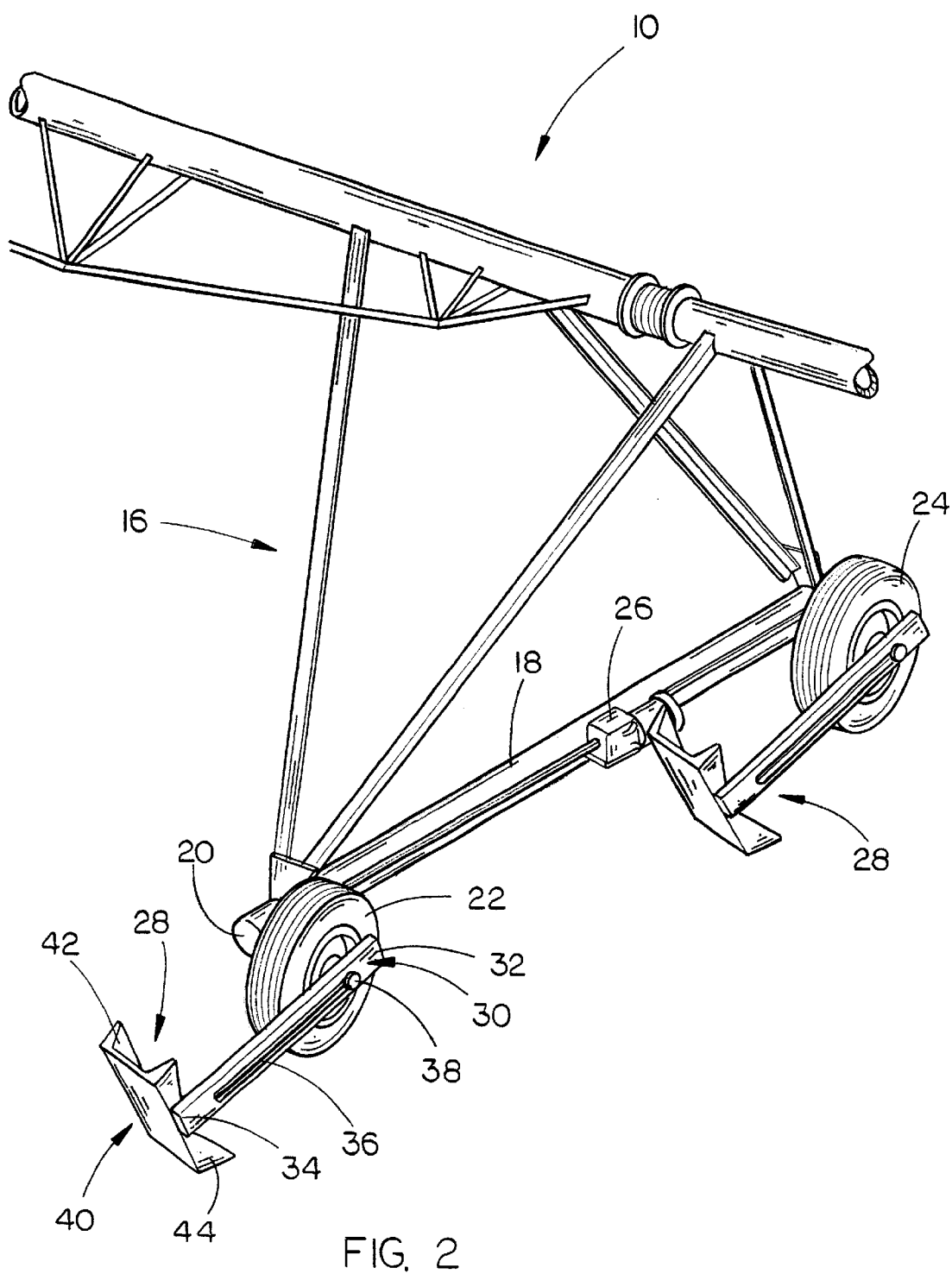
FIG. 2 is a partial perspective view illustrating the irrigation system being moved in a first or forwardly direction.
Figure 3A:
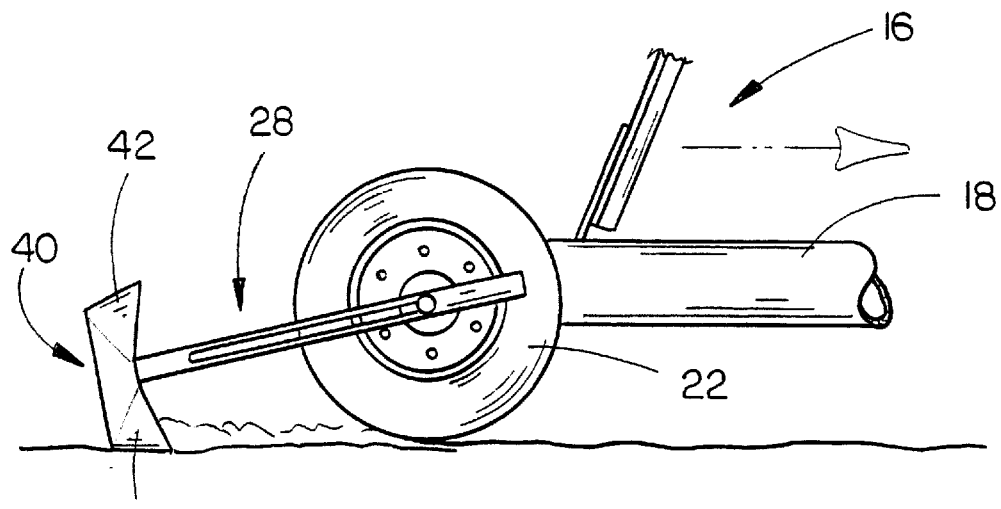
FIG. 3A is a partial side view illustrating the drive unit being moved in a first or forwardly direction.
Figure 3B:
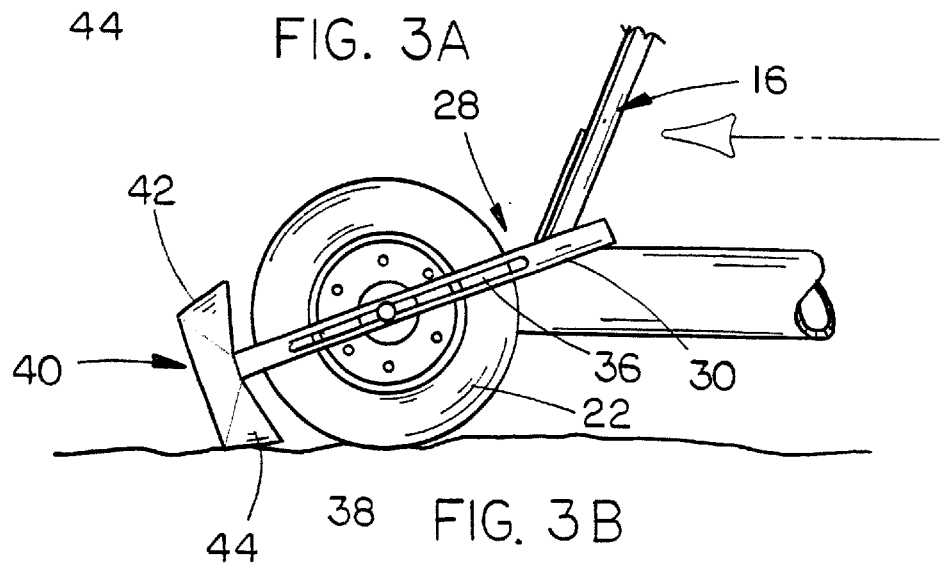
FIG. 3B is a view similar to FIG. 3A except that the direction of movement of the drive unit has been reversed.

FIGS. 2, 3A, and 4 illustrate the irrigation system 10 being moved in a first (forward) direction. As system 10 moves forwardly, the assemblies 28 trail behind the drive wheels 22 and 24. As seen in FIG. 3A, when the drive unit 16 is moved in a forward direction, shovel member 44 is in engagement with the soil adjacent the wheel track to move the soil into the wheel track to close the same. When it is necessary to reverse the direction of movement of the system, the drive wheels will "walk-over" the assemblies to re-position the assemblies 28. As seen in FIG. 3B, when the movement of the drive unit 16 is reversed from the direction of FIG. 3A, the engagement of the shovel member 44 with the ground causes arm 30 to slidably and pivotally move with respect to the drive wheel since slot 36 permits relative movement between arm 30 and connector 38.

Figure 3C:
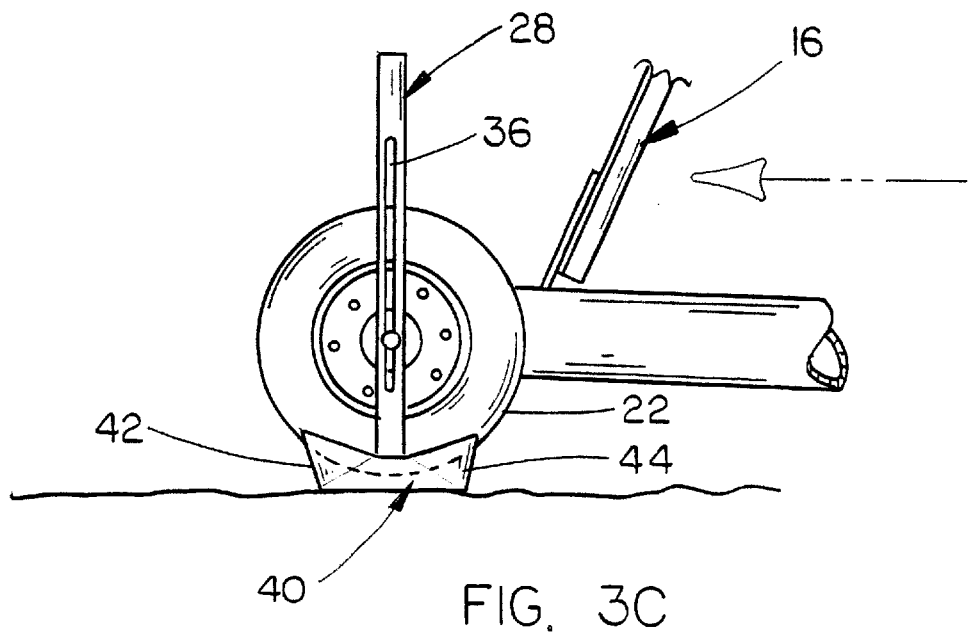
FIG. 3C is a view similar to FIG. 3B except that the drive wheel is shown as moving over the soil-engaging member.
Figure 3D:
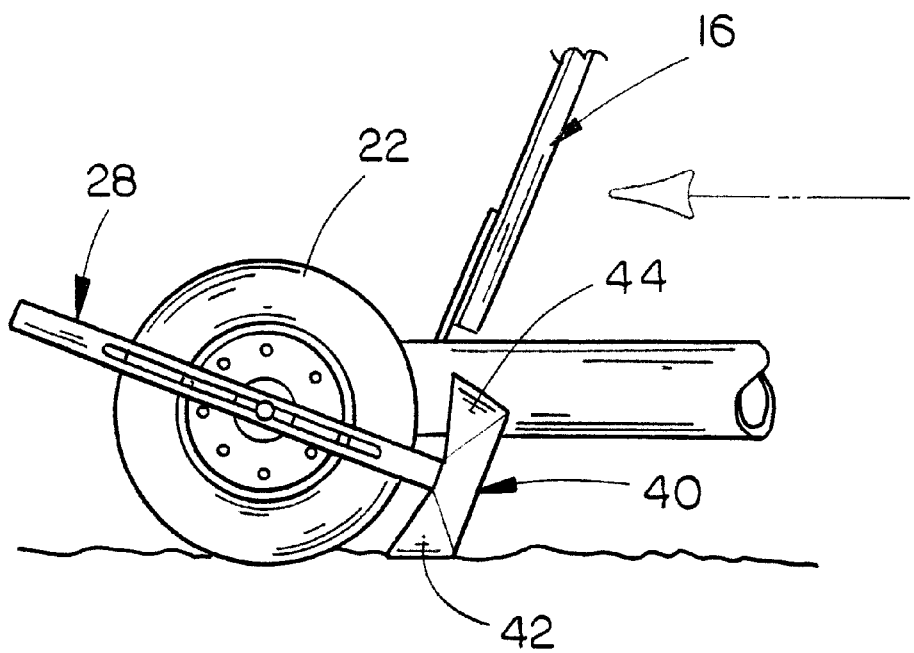
FIG. 3D is a view similar to FIG. 3C except that the drive wheel has completely passed over the soil-engaging member.
Figure 3E:
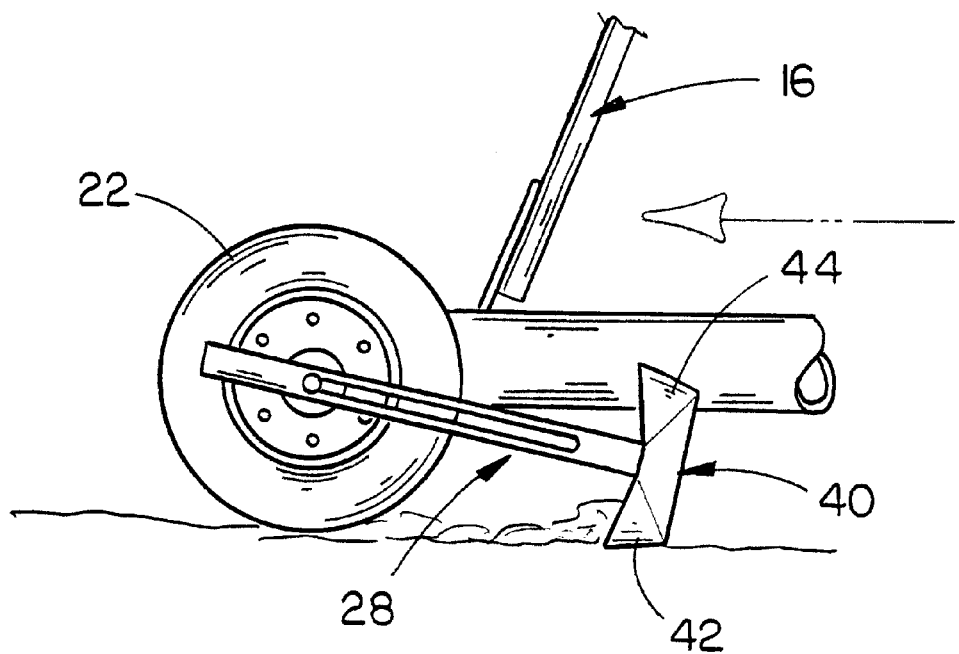
FIG. 3E is a view similar to FIG. 3D except that the wheel track closing assembly has moved to its operative position.

Continued movement of the drive unit 16 in the direction indicated by the arrow in FIG. 3C causes the drive wheel to move over the soil-engaging member 40. FIG. 3D illustrates the position of the soil-engaging member 40 after the drive wheel has passed thereover. Continued movement of the drive unit 16 causes the assembly 28 to be positioned, as seen in FIG. 3E, so that the assembly 28 is again in its working position in a trailing relationship to the associated drive wheel. When the movement of the drive unit 16 is reversed from the direction illustrated by the arrow in FIG. 3E, the assembly 28 will automatically shift to the position of FIG. 3A in the same manner as that just described.

It can therefore be seen that an improved wheel track closing device has been described which may be easily mounted on irrigation system drive units without extensive modification of the drive unit. Further, it can be seen that the wheel track closing assembly of this invention permits the irrigation system to be reversed without the need for an operator to manually re-position the wheel track closing assemblies since the assemblies automatically shift to a trailing operation.

It can therefore be seen that the wheel track closing assembly of this invention accomplishes at least all of its stated objectives.

We claim:

1. In combination with a reversible, self-propelled irrigation system which is movable in a forward direction and a rearward direction including a plurality of drive units, each said drive unit having an elongated main beam with a drive wheel mounted at each end thereof, a gearbox at each end of the main beam for driving the associated drive wheel in a forwardly or rearwardly direction, and a motor mounted on the main beam for driving the gearboxes, comprising:

at least one track closing assembly mounted on at least some of the drive units adjacent one of the drive wheels thereof for closing the track formed by the drive wheels thereof;

each of said track closing assemblies being movable between first and second positions with respect to the associated drive wheel;

each of said track closing assemblies normally being in the said first position when the irrigation system is moving in a forward direction;

each of said track closing assemblies being in the said second position when the irrigation system is moving in a rearward direction;

each of said track closing assemblies automatically moving between its said first and second positions as said irrigation system changes its direction of movement;

each of said track closing assemblies including a soil-engaging member which is positioned behind the associated drive wheel when said track closing assembly is in its said first position and in its said second position.

2. The combination of claim 1 wherein each of said track closing assemblies includes means for enabling the associated drive wheel to move over said soil-engaging member as said track closing assembly moves between its said first and second positions.

3. The combination of claim 1 wherein said soil-engaging member comprises a shovel means including first and second shovel members; said first shovel member engaging the soil behind the associated drive wheel when the associated track closing assembly is in its said first position; said second shovel member engaging the soil behind the associated drive wheel when the associated track closing assembly is in its said second position.

4. The combination of claim 1 wherein said soil-engaging member is selectively removable from the associated track closing assembly to enable a different configured soil-engaging member to be substituted therefore.

5. The combination of claim 1 wherein said track closing assembly is secured to the associated drive wheel.

6. The combination of claim 1 wherein said track closing assembly is secured to the associated gearbox.

7. The combination of claim 5 further including an elongated arm, having first and second ends, which connects said soil-engaging member to the associated drive wheel; said elongated arm having a longitudinally extending slot formed therein; the associated drive wheel including a connector which is pivotally and slidably received by said slot in said elongated arm.

8. The combination of claim 6 further including an elongated arm, having first and second ends, which connects said soil-engaging member to the associated gearbox; said elongated arm having a longitudinally extending slot formed therein; the associated gearbox including a connector which is pivotally and slidably received by said slot in said elongated arm.

9. The combination of claim 1 wherein said irrigation system comprises a center pivot irrigation system.

10. The combination of claim 1 wherein said irrigation system comprises a lateral move irrigation system.

11. The combination of claim 1 wherein a track closing assembly is provided for each of the drive wheels on the drive units.

12. The combination of claim 1 wherein track closing assemblies are mounted on each of the drive units.

13. The combination of claim 12 wherein a track closing assembly is provided for each of the drive wheels on the drive units.

* * * * *